May 3, 1966     W. A. GERRANS     3,248,865

FRUIT AND NUT HARVESTER

Original Filed Nov. 17, 1961     6 Sheets-Sheet 1

*INVENTOR.*
WILLIAM A. GERRANS
BY
*Paul B. Fihe*
PATENT AGENT

May 3, 1966 W. A. GERRANS 3,248,865
FRUIT AND NUT HARVESTER
Original Filed Nov. 17, 1961 6 Sheets-Sheet 2

INVENTOR.
WILLIAM A. GERRANS
BY
*Paul B. Fike*
PATENT AGENT

May 3, 1966 W. A. GERRANS 3,248,865
FRUIT AND NUT HARVESTER
Original Filed Nov. 17, 1961 6 Sheets-Sheet 3

INVENTOR.
WILLIAM A. GERRANS
BY Paul B. Fike
PATENT AGENT

May 3, 1966 W. A. GERRANS 3,248,865
FRUIT AND NUT HARVESTER
Original Filed Nov. 17, 1961 6 Sheets-Sheet 4

INVENTOR.
WILLIAM A. GERRANS
BY
Paul B. Fihe
PATENT AGENT

May 3, 1966     W. A. GERRANS     3,248,865
FRUIT AND NUT HARVESTER
Original Filed Nov. 17, 1961     6 Sheets-Sheet 5

*INVENTOR.*
WILLIAM A. GERRANS
BY
Paul B. Fiche
PATENT AGENT

May 3, 1966   W. A. GERRANS   3,248,865
FRUIT AND NUT HARVESTER
Original Filed Nov. 17, 1961   6 Sheets-Sheet 6

FIG_12

FIG_13

INVENTOR.
WILLIAM A. GERRANS
BY
Paul B. Fike
PATENT AGENT

United States Patent Office 3,248,865
Patented May 3, 1966

3,248,865
FRUIT AND NUT HARVESTER
William A. Gerrans, 15 Florimond Drive, Colusa, Calif.
Continuation of application Ser. No. 153,069, Nov. 17, 1961. This application May 10, 1965, Ser. No. 468,664
16 Claims. (Cl. 56—328)

The present invention relates to mechanical harvesting equipment and more particularly to a harvester for tree-grown fruits and nuts. This is a continuation of my co-pending application, Ser. No. 153,069 filed November 17, 1961, now abandoned.

The decreased availability of personnel for manual fruit and nut harvesting combined with the increased cost of such labor has resulted in ever-greater effort directed to the development of fruit and nut harvesters of a mechanical and preferably substantially automatic nature. Since, it is well known that vibration of a tree will dislodge ripe fruit or nuts carried thereby, various mechanical tree shakers have been devised. Such shakers are conventionally mounted on a tractor or on a catching unit that receives the dislodged fruit or nuts and is, in some cases, arranged to convey the product to receiving boxes or bins.

For effecting operation, it is obviously necessary that a large percentage of the fruit or nuts be dislodged by the shaker, and as a result, rather considerable shaking forces must be developed. These forces have caused damage not only to the bark and/or limbs of the tree but also to the tractor or other shaker-supporting unit, and as a consequence, the theoretical advantages of mechanical shaking have been more than offset by the noted damage to the trees and the supporting units. By way of example, instances are known where an expensive tractor has been damaged substantially beyond repair during a one-month harvesting season.

Additional failure to realize the theoretical advantages of mechanical fruit and nut harvesting has stemmed from the poor maneuverability of the presently-available units. The time requisite to establish shaking contact with the tree and appropriate positioning of the catching unit thereunder has been so excessive as to render the comparatively short time needed to harvest the fruit from an individual tree a secondary and relatively unimportant consideration in the overall harvesting operation.

With these and other more specific deficiencies of known harvesting equipment in mind, it is the general object of the present invention to provide a fruit and nut harvester which is at once simple, effective, and rapid in its operation, and moreover, precludes damage to the trees and to the tractor or other supporting structure.

It is a significant feature of the present invention to provide a fruit and nut harvester that incorporates an inertia shaking mechanism and a mounting arrangement therefor so that although considerable shaking force may be imparted to an engaged tree, substantially no force is transmitted to the tractor or other structure that supports such shaking mechanism.

A correlated feature of the invention is the provision of a fruit and nut harvester wherein the mounting for the shaking mechanism is arranged to enable easy manipulation into tree engaging relationship although substantially no forces are transmitted through such mounting arrangement to the shaker supporting structure.

Yet an additional feature of the invention is the provision for convenient, accessible control of the placement and operation of the shaking mechanism in order to optimize the overall rate of fruit or nut harvesting.

More particularly, it is a feature of the invention to provide a readily accessible hydraulic control system for effecting engagement with the tree and subsequent shaking or vibration thereof.

Yet another feature of the invention is the provision of a tree clamping arrangement which effectively transmits vibratory forces to the tree yet minimizes any bark or limb damage thereto.

Additionally, in accordance with one aspect of the invention, it is a feature to provide for the application of shaking or vibratory forces to the tree at various selected angles after clamping engagement has been established with the tree.

Yet another feature of the invention is the provision of a fruit and nut harvester that includes a tree shaking mechanism and a catching unit for dislodged fruit or nuts arranged in a complementary fashion so as to facilitate their conjoined utilization.

Yet more particularly, it is a feature of the invention to provide for the mounting of a shaking mechanism on a fruit or nut catching unit in a manner such that ready adjustment for a harvesting operation and/or transportation of the entire assembly is facilitated.

Another feature of the invention relating particularly to the catching unit is the provision of a structural arrangement including catching elements and a conveyor arranged in a manner to facilitate the reception and subsequent delivery of the received fruit or nuts into storage boxes or bins.

Yet another feature of the invention is the provision of a combined tree shaking mechanism and catching unit on a common mobile frame so as to facilitate the placement of the entire harvesting unit into operative harvesting relationship with each individual tree.

A correlated feature is the provision of a common prime mover to effect motion of the mobile unit, clamping engagement with a tree, dislodging or fruits or nuts from such tree, and conveyance of the dislodged fruit or nuts into receiving bins or boxes.

These as well as additional objects and features of the invention will become more apparent from a perusal of the following description of the structures illustrated in the accompanying drawings wherein.

Generally, in accordance with the present invention, the fruit and nut harvester embodies an improved tree shaking mechanism and supporting structure therefor to enable such shaking mechanism to be brought into operative fruit or nut harvesting engagement with a tree. The supporting structure may include a conventional mobile support, such as a tractor, in which case the dislodged fruit or nuts are subsequently gathered from the ground by any one of a number of known pick-up devices which form no part of the present invention, or preferably, the supporting structure will include a catching unit which receives the dislodged fruit or nuts and automatically conveys the same to storage bins or boxes.

Figure 1:
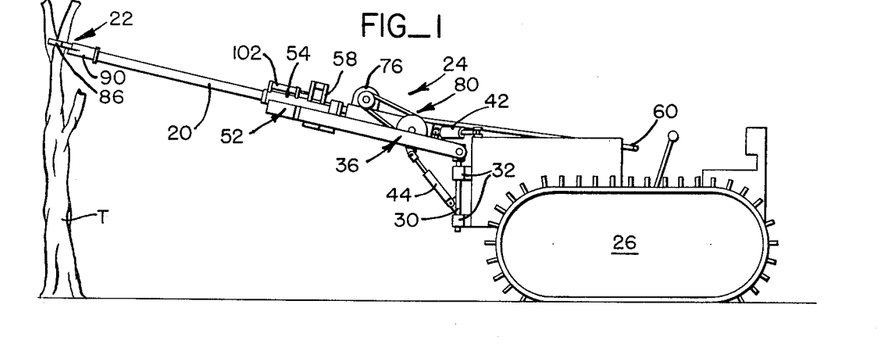
FIG. 1 is a side elevational view of one embodiment of the invention wherein a tree-shaking mechanism is mounted on a conventional tractor.
Figure 2:
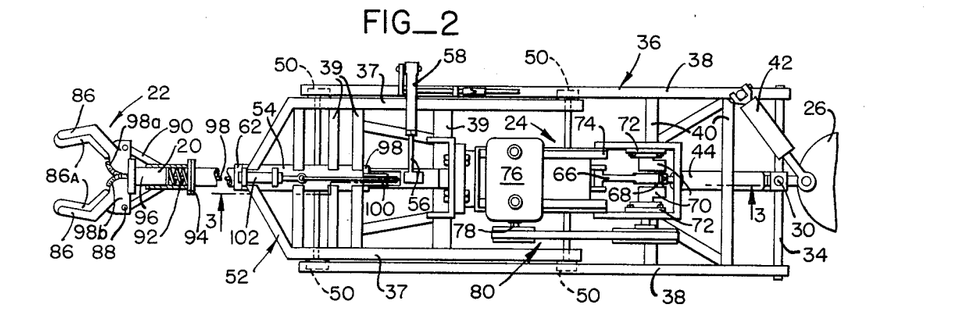
FIG. 2 is an enlarged top plan view of the FIG. 1 structure, portions being broken away to illustrate certain details.
Figure 3:
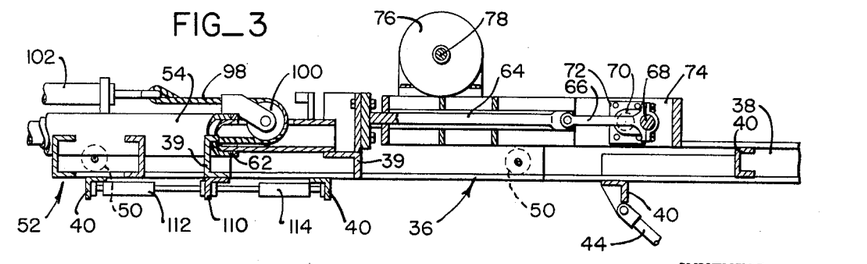
FIG. 3 is an enlarged sectional view taken substantially along line 3—3 of FIG. 2.

With specific reference to FIGS. 1, 2, and 3, one embodiment of the invention, wherein the shaking mechanism is mounted on a conventional tractor, is illustrated and will be initially described. Generally, this first embodiment of the invention includes a boom 20 having a a tree-engaging clamp 22 mounted at its outer free end and a shaking mechanism 24 for imparting shaking or vibratory motion longitudinally of the boom carried at its inner supported end, the entire structure being mounted on a tractor 26 so that although pivotal and longitudinal adjustments of the boom 20 can be made in order to effect engagement with a tree T and subsequent shaking thereof, substantially no vibratory forces are transmitted to the supporting tractor.

More particularly, a vertical standard 30 is rotatably supported in suitable brackets 32 secured to the forward portion of the tractor and mounts at its upper end a generally transverse horizontal rod 34 that pivotally supports at its extremities one end of a forwardly projecting flat rectangular frame 36 that consists of laterally-spaced, facing parallel U-channel members 38 and suitable rigid braces 40 joining such channel members to maintain their parallel spaced relationship. One hydraulic cylinder 42 is connected pivotally between the tractor 26 and the projecting frame 36 to enable variance of its horizontal angle of projection from its pivotal support on the tractor, and a second hydraulic cylinder 44 is connected between the rotatable standard 30 and the frame 36 to enable vertical adjustment of the latter about the horizontal pivot defined by the transverse rod 34. Suitable valved hydraulic connections are made from both cylinders 42, 44 to a hydraulic pump (not shown) on the tractor and under control of the tractor operator.

The inturned flanges of the facing U-channel members 38 of the pivoted frame 36 loosely confine therebetween the four wheels or rollers 50 of a boom carriage 52 that also consists of longitudinal and transverse frame elements 37, 39 and is adapted to roll longitudinally of the supporting frame 36 a limited distance toward or away from the tractor 26. The boom carriage 52 centrally supports a tubular sleeve 54 that is adapted to receive and support the boom 20 itself, which is also of tubular construction, on the boom carriage 52 for relative rotation with respect thereto. In order to effect rotation of the boom 20 within the sleeve 54, an arm 56 is operatively joined to the boom beyond one end of the sleeve 54 by a universal joint and is connected through suitable linkage 58 to an actuating handle 60 adjacent the operator's seat on the tractor 26. Collars 62 on the boom 20 at opposite ends of the sleeve 54 assure longitudinal movement of the boom 20 with the boom carriage 52.

In order to effect longitudinal or axial movement of the boom 20 and the boom carriage 52, a rearwardly projecting tongue 64, rigidly mounted on the boom carriage 52, is pivotally connected to one end of a connecting rod 66, the other end of which is pivotally joined to an eccentrically located pin 68 on a crank shaft 70 suitably supported in bearings 72 on a secondary mounting frame 74 that slidably encompasses the tongue 64 and carries a hydraulic motor 76 whose drive shaft 78 is connected to the crank shaft 70 by a suitable belt and pulley arrangement, indicated at 80. Thus, when the hydraulic motor 76 is actuated through suitable flexible hydraulic lines (not shown) connected to the aforementioned hydraulic pump on the tractor 26, one mass including the hydraulic motor 76 and its mounting frame 74 is caused to move first toward and then away from a second mass including the boom 20 and the boom carriage 52, to thus effect an inertial vibration of the latter, such inertial effect being generally well known. However, it is to be noted that while the inertial vibration causes relative movement of the hydraulic motor 76 and the joined boom 20 and boom carriage 52, since the boom carriage is mounted by the rollers 50 on the pivoted frame 36 connected to the tractor 26, substantially no vibratory forces are delivered to such pivoted frame or the tractor itself.

For the harvesting of prunes by way of example, a hydraulic pressure of 2000 pounds per square inch is delivered by the pump to the hydraulic motor 76 to effect a rotation of approximately 1000 revolutions per minute, and the eccentric pin 68 is mounted to provide a boom stroke of approximately three inches. Preferably, for this same harvesting function, the overall length of the tubular boom 20 is approximately twenty feet.

At its outer end, the boom 20 carries the mentioned tree-engaging clamp 22 that, as best illustrated in FIG. 2, includes a pair of like clamping jaws 86 that are adapted to project on opposite sides of a tree trunk or limb that is to be shaken. More particularly, the clamping jaws 86 are pivotally mounted on parallel pins 88 on brackets 90 that project angularly forward from opposite sides of the boom 20, each jaw being of slightly curved or hooked configuration so as to substantially entirely encompass the tree T when the jaws are pivoted into opposed engagement therewith. A coil spring 92 is mounted within the end of the tubular boom 20 under compression between a shoulder 94 thereon and a slidable tube 96 that engages the inwardly projecting ends of the clamping jaws 86 so as to normally urge such jaws into open, inoperative positions. In order to effect clamping engagement of the jaws 86 with an encompassed tree T, a cable 98 is connected to two link chains 98a, 98b, fastened to the inwardly projecting ends of the jaws and extends through the entire length of the tubular boom 20 and around a pulley 100 for connection to one end of a hydraulic cylinder 102 that is mounted on the sleeve 54 and is adapted, upon actuation through a suitable control linkage (not shown) accessible to the tractor operator, to exert tension on the cable 98 and thus effect the desired closure of the clamping jaws 86 into engagement with the tree trunk or limb. Preferably, the inner surfaces of the jaws 86 are provided with a layer of rubber or other resilient material 86A so as to enable the transmission of shaking force to the tree T yet minimize the possibility of damage to its bark.

In order to rapidly position the described tree clamp in encompassing relationship with a tree trunk or limb, a rod 110 projects downwardly from the boom carriage 52 and is engaged on its opposite side by the projecting ends of opposed hydraulic cylinders 112, 114 that are mounted on the transverse members 40 of the pivoted frame 36 in substantial longitudinal alignment with the boom 20 and are actuated by suitable control linkage (not shown) accessible to the tractor operator. One hydraulic cylinder can be retracted while the other is extended to thus shift the longitudinal position of the boom carriage 52 on the pivoted frame 36 to accordingly extend or retract the boom 20 and the clamp 22 at its outer end. After clamped engagement has been established with the tree T, both hydraulic cylinders 112, 114 are retracted so that the clamp 22, the boom 20, and the boom carriage 52, are free to reciprocate relative to the pivoted frame 36 under the inertial actuation of the hydraulic motor 76, as described hereinabove.

In use, the tractor 26 is driven by the operator to a position appropriately adjacent the tree T and the pivoted frame 36 is elevated and/or turned until the clamp 22 is aligned with the trunk or limb to be shaken but spaced a short distance therefrom. Such position is attained preferably while the boom carriage 52 is fully withdrawn on the supporting pivoted frame 36 through appropriate actuation of the opposed hydraulic cylinders 112, 114. After such adjacent positioning has been attained, the operator actuates the handle 60 to rotate the boom an appropriate amount, if necessary, to bring the clamping jaws 86 into alignment with the opposite sides of the trunk or limb of the tree T and the opposed hydraulic cylinders 112, 114 are then actuated to project the boom carriage 52, the boom 20, and the clamping jaws 86 into tree-encompassing relationship. The clamp hydraulic cylinder 102 is then actuated to close the jaws 86 into tight clamping engagement with the trunk or limb of the tree T, and the positioning hydraulic cylinders 112, 114 are then fully retracted to permit free forward and rearward motion of the boom carriage 52 and the supported boom 20 and clamp 22 longitudinally of the pivoted supporting frame 36. The operator may now effect hydraulic actuation of the hydraulic motor 76 so as to exert inertial forces longitudinally of the boom 20 to swing the trunk or limb of the tree to and fro rapidly thus to dislodge the fruit or nuts therefrom.

The fruit or nuts are either dropped onto the ground, in which case, a separate ground pick-up mechanism is employed to complete the harvesting, or alternatively, a separate catching unit may be positioned under the tree T during the shaking operation to receive and collect the dislodged fruit or nuts, neither arrangement being illustrated since they form no part of the present invention.

After the fruit or nuts have been entirely dislodged from the tree T, the opposed hydraulic cylinders 112, 114 are first brought into opposed contact with the boom carriage 52 and the clamp 22 is then opened and subsequently withdrawn from the sides of the trunk or limb by further actuation of the opposed hydraulic cylinders 112, 114 whereupon the tractor 26 may be driven to the next tree to be harvested or the boom 20 may be adjusted to provide engagement with another limb on the same tree and the described operation repeated at such new position. It is to be particularly observed that the tractor 26 need only bring the boom 20 into an adjacent position relative to a tree and the boom adjustment and the final movement of the clamp 22 into trunk or limb engagement is achieved through the hydraulic control mechanisms which are sufficiently sensitive so that neither the tree nor the boom will be damaged during initial engagement therebetween. Further, it is to be noted that although the boom carriage 52 during operation will transmit no forces to its supporting frame 36 or the tractor 26, yet during positioning of the boom 20 and more particularly the clamp 22 in engagement with the tree T, positive control of the boom and clamp disposition is enabled.

As has been mentioned hereinabove, a separate catching unit can be employed with the described first embodiment of the invention, but in accordance with certain additional aspects of the invention, the supporting structure for the shaking mechanism can take the form of a mobile unit that is itself formed to provide a catching unit, as illustrated in FIGS. 4 to 9. As will become apparent from the following description certain advantages accrue from the utilization of such a conjoined structure, the most important of which is the mounting of the shaking mechanism on the catching unit so that when such catching unit is appropriately positioned to receive fruit or nuts from a tree, access to the trunk and limbs of the tree by the shaking mechanism is assured.

Figures 4, 9:
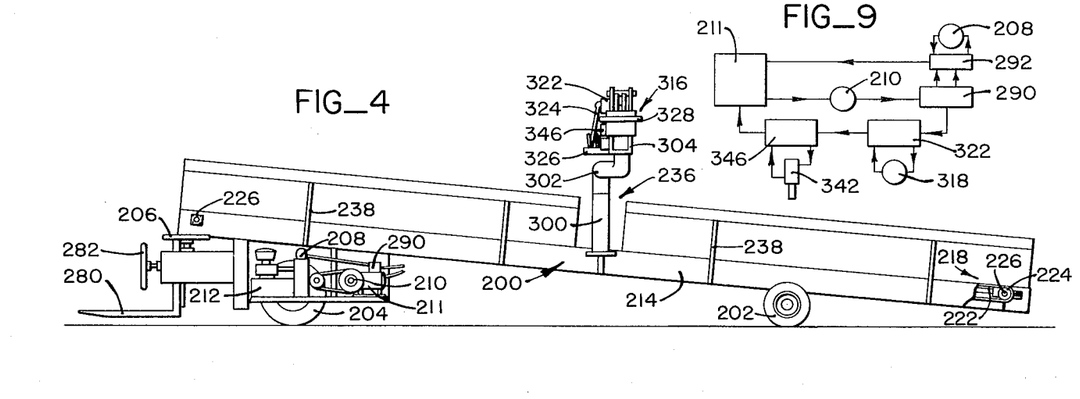
FIG. 4 is a side elevational view of a modified embodiment of the invention showing a tree-shaking mechanism mounted on a fruit or nut catching unit.
FIG. 9 is a hydraulic control diagram illustrating the system incorporated in the structure illustrated in FIGS. 4, 5, and 6.

The catching unit includes a generally flat rectangular frame 200 supported for movement on more or less conventional wheels 202, 204, which, however, are arranged to provide a longitudinal sloping disposition of such frame so that the same rises from a total height of approximately eighteen inches at its forward end to a height of approximately forty inches at its rearmost extremity, as can best be visualized by reference to FIG. 4. For such support, the front wheels 202 are relatively small and are mounted under the frame 200 a predetermined distance rearwardly of the front end of the catching unit. These front wheels 202 are mounted for conjoint pivotal movement about vertical axes and their disposition is controlled in a conventional manner by suitable linkage (not shown) connecting the wheels to a steering wheel 206 mounted at the right rear of the catching unit. The other supporting wheels 204 for the unit, which are preferably larger, are mounted adjacent the rear end of the catching unit frame 200 and are suitably driven from a hydraulic motor 208 actuated by a hydraulic pump 210 connected to a tank 211 and driven by a gasoline engine 212, all of which are mounted at the right rear of the unit adjacent the aforementioned steering wheel 206. Since these drive units and the connecting elements are conventional, they will not be described in detail.

Figure 6:
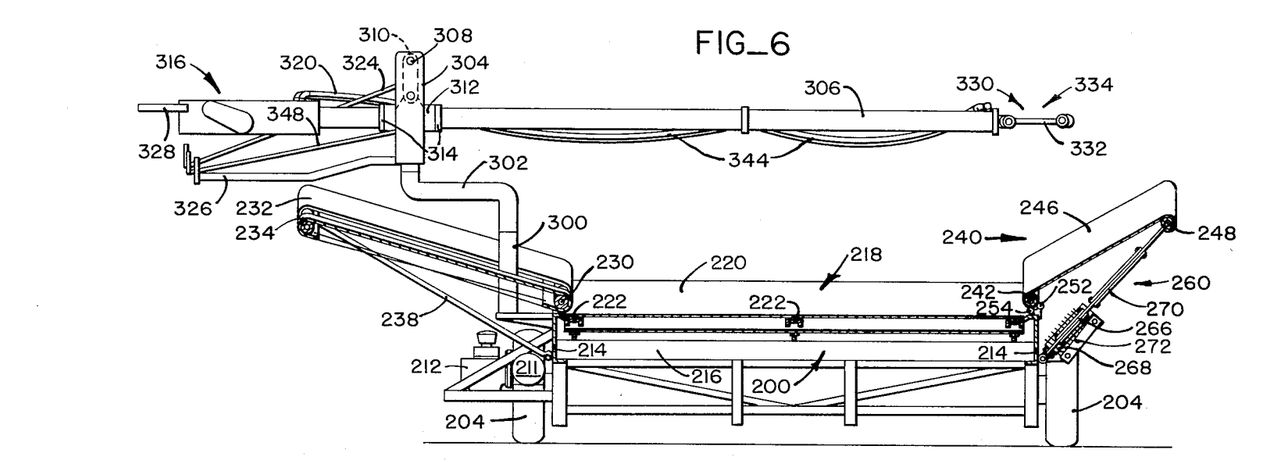
FIG. 6 is an enlarged transverse sectional view thereof taken along line 6—6 of FIG. 5.

As shown in FIGS. 4 and 6, the mentioned frame 200 includes parallel longitudinal frame members 214 that are joined by suitable rigid cross braces 216 and support therebetween an endless conveyor 218 that consists of an endless piece of canvas 220 of appropriate dimensions that is secured on three spaced conveyor belts 222, each of which is trained about suitable friction rollers 224 secured in aligned relationship on transverse shafts 226 rotatably mounted by suitable bearings on the longitudinal members 214 of the frame 200 adjacent the opposite extremities thereof. The shaft 226 adjacent the rear end of the catching unit is connected through a suitable clutch (not shown) to the engine 212 so that the conveyor 218 will be driven at an appropriate rate of speed with its upper flight moving from the front to the rear of the catching unit.

A rod 230 is mounted to extend the entire length of the frame 200 above the longitudinal frame member 214 on the right side of the unit and pivotally supports a pair of wings 232, 234 that are slightly spaced as indicated at 236 and each of which consists of a rectangular frame composed of tubing with canvas suitably secured over the upper surface thereof and braces 238 pivotally secured to its undersurface and detachably to the side of the frame member 214 so as to hold the wing in a laterally angular disposition whose slope is sufficient to insure that any fruit or nuts falling thereupon will subsequently roll thereover downwardly onto the previously described conveyor 218. When the braces 238 are detached from the frame member 214, the wings 232, 234 can be pivoted to lie over the conveyor 218 in inoperative positions.

On the left side of the catching unit, a retractable canvas wing, generally indicated at 240, is supported. More particularly, and with additional reference to FIG. 7, a long shaft 242 extends above the entire length of the longitudinal frame member 214 and is rotatably supported at its extremities in suitable bearings 244. Between these bearings, a large piece of canvas 246 is connected at its one edge to the shaft 242 so that upon appropriate rotation of the shaft, the canvas can be rolled thereon or unrolled therefrom. At its opposite edge, the canvas 246 is secured to two rod sections 248, each of which extends from one end thereof a predetermined distance so that the central portion of the canvas edge remains unsupported by the rod sections. A resilient cord 250 is tied at its ends to the rod sections 248 and resiliently supports the edge of the canvas 246 in the central space between the rods. Between the rotatably supported ends of the shaft 242, spaced pairs of freely rotatable rollers 252, 254 are mounted in alignment on the upper side of the longitudinal frame member 214 and are adapted to provide longitudinally-spaced support for the shaft 242 and the canvas 246 rolled thereon.

Figure 5:
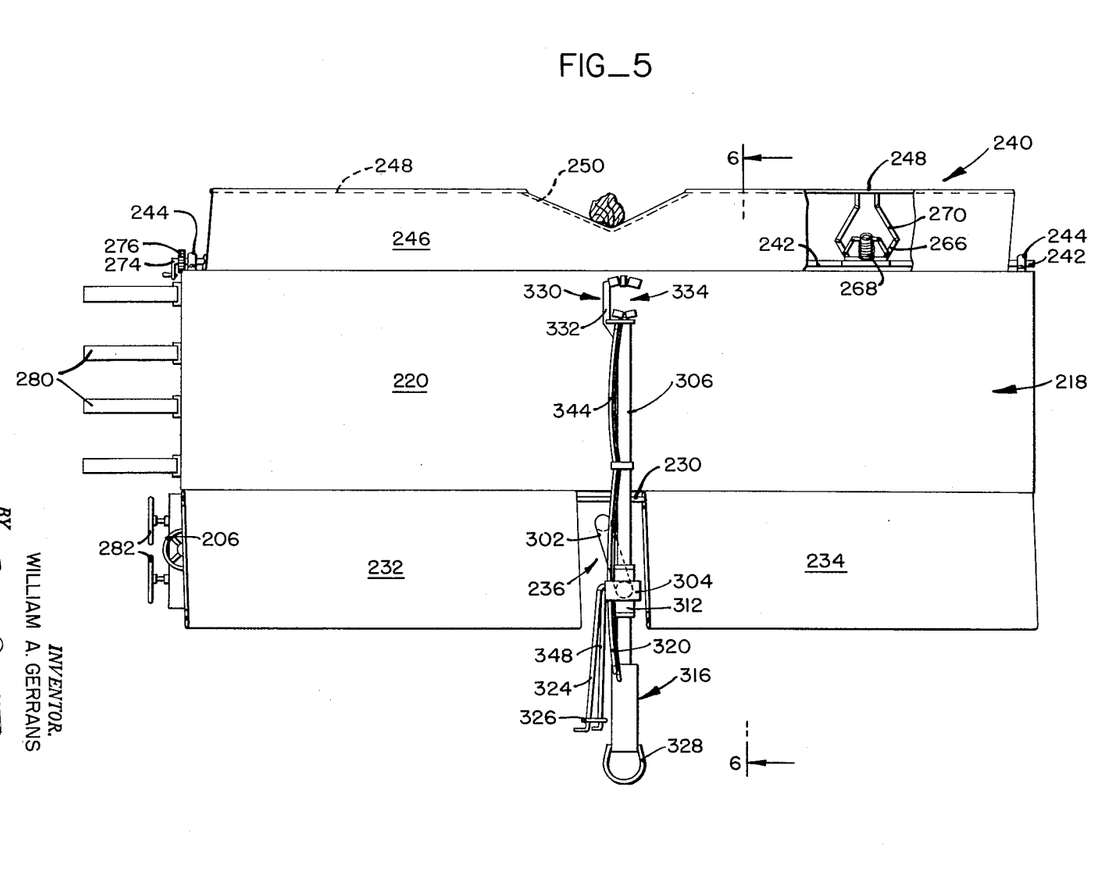
FIG. 5 is a top plan view of the FIG. 4 structure.
Figure 7:
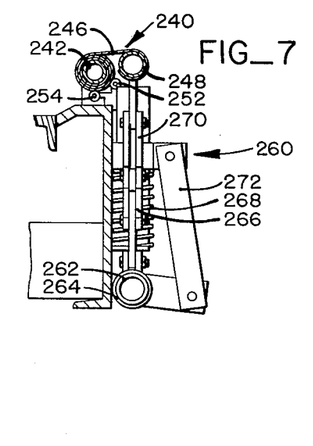
FIG. 7 is an enlarged, fragmentary view of a portion of the structure as viewed in FIG. 6 but in a different operational position.
Figure 8:
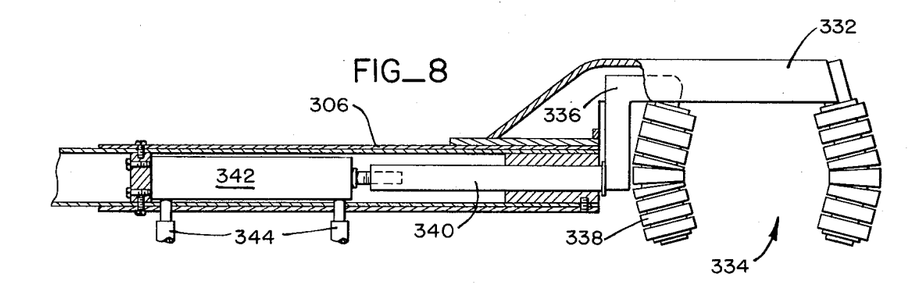
FIG. 8 is an enlarged fragmentary plan view of a tree-engaging hook constituting part of the structure illustrated in FIGS. 4, 5, and 6, portions being broken away to illustrate structural details.

In order to unroll the canvas 246 from its retracted position, as shown in FIG. 7, and achieve the desired extension of the wing 240 in the transversely sloped disposition, as illustrated in FIGS. 5 and 6, whereat fruit or nuts can be received thereon and permitted to roll downwardly onto the centrally-disposed conveyor 218, means generally indicated at 260 are pivotally connected between the side of the longitudinal frame member 214 and each of the rod sections 248 at the outer edge of the canvas. More particularly, and with continued reference to FIGS. 5, 6 and 7, such wing-extension means 260 includes a pivot rod 262 rigidly secured to the side of the frame member 214 in a substantial parallelism therewith and an extensible linkage pivotally supported on such rod and connected at its remote end to the respective one of the rod sections 248 at the outer edge of the canvas 246. Between a base member 264 which is pivotally mounted on the described rod 262 and one extremity of a first dual-toggle linkage 266, a coil spring 268 is disposed under compression so as to normally urge such toggle linkage into an extended position. One link of the toggle linkage 266 is extended so as to form a lengthened link of a second dual-toggle linkage 270 whose outer extremity is secured to the described rod section 248. Thus, when the first toggle linkage 266 is extended, the second toggle linkage 270 is automatically extended therewith under the action of the coil spring 268 to ultimately urge the rod section 248 away from the supporting rod 262 for the toggle linkages 266, 270.

In order that the canvas may not only be extended directly outwardly from its collapsed or rolled disposition, as illustrated in FIG. 7, to its extended sloping disposition, illustrated in FIGS. 5 and 6, but also be firmly held at this latter sloping disposition, a third linkage 272 is connected rigidly at its one end to the supporting rod 262 and pivotally at its remote end to the outer extremity of the first toggle linkage 266. The lengths of the links in this linkage 272 are such that as the extension of the toggle linkages 226 and 270 occurs under the action of the coil spring 268 so as to effect extension of the rod section 248, the third linkage 272 effects a pivoting of the entire wing-extension means 260 about the supporting rod 262 from the vertical disposition, illustrated in FIG. 7, to the angular disposition illustrated in FIG. 6. At such extended disposition, all of the linkages 266, 270, 272 are substantially straightened and provided a rigid support for the rod section 248 and accordingly a firm support for the extended canvas wing 240.

In order to retract the wing 240 against the action of the coil spring 268, a crank 274 is releasably connected to one end of the canvas supporting shaft 242. Manual turning of the crank 274 winds the canvas on the shaft 242 and a conventional releasable ratchet mechanism 276 holds the canvas in its wound or rolled disposition.

It will be apparent from the foregoing that the described catching unit can be driven by an operator into a position generally adjacent a tree T while the left side wing 240 is retracted, as shown in FIG. 7. Once an appropriate position has been obtained with the tree T substantially centrally aligned with the center of the left side of the catching unit, further forward motion of the catching unit is stopped and the operator releases the left-side wing 240, which thereupon is projected under the action of the compressed coil spring 268 to an outwardly extended and appropriately sloped position with the resilient central portion in encompassing engagement with the tree T, as shown best in FIG. 5. It will be observed that the central resilient section of the wing 240 provides encompassment of the tree T even though considerable latitude in the precise placement of the catching unit is permitted. Consequently, the catching unit can be brought into operative engagement with each tree T both quickly and easily to thus expedite the harvesting operation.

Any fruit or nuts falling on the wings 232, 234, 240 will, under the force of gravity, roll downwardly onto the central conveyor 218 which will carry such fruit or nuts together with those that fall directly on the conveyor from the front to the rear of the catching unit. Preferably, at the rear end of the catching unit, a pair of conventional fork structures 280 are mounted for vertical adjustment under control of the operator through adjustment wheels 282 located adjacent the described steering wheel 206 and appropriate connecting linkage (not shown). These forks 280 are adjusted so that the open top of a bin or box resting thereon will be below the end of the conveyor 218 to receive the fruit or nuts discharged therefrom.

It will be apparent that the described catching unit will receive fruit or nuts only from one half of a tree T. A similar catching unit can be driven to the other side of the tree T simultaneously to receive and deposit in boxes or bins the fruit or nuts dropped from that side. For the specific purpose of harvesting prunes, the overall length of the catching unit should be approximately twenty-five feet and the overall width including the projecting wings 232, 234, 240 should be approximately fifteen feet. Such dimensions permit easy movement of the catching units through an orchard when the left side wing 240 is in its rolled or retracted position. Yet when such wing 240 is extended to closely encompass the tree T in its operative position, reception of all fruit or nuts from the tree is assured.

In order to dislodge the fruit or nuts from the tree T when the described catching unit is positioned thereunder, an inertia shaking mechanism of general similarity to that described in connection with the first embodiment of the invention is mounted directly on the catching unit in a position such that when the catching unit is appropriately positioned for reception of the fruit or nuts from the tree, as above described, the shaking mechanism can be quickly and easily moved into tree-engaging position to instigate the dislodging of the fruit or nuts.

With continued reference to FIGS. 4, 5, and 6, preferably a tubular standard 300 is mounted on the right side longitudinal frame member 214 approximately centrally thereof to project upwardly through the space 236 between the wings 232, 234 of the catching unit and pivotally carry at its uppermost end a laterally extending arm 302 that may be swung a complete revolution about the vertical axis defined by the standard. A boom-carrying yoke 304 is rotatably supported on and projects vertically upward from the end of such laterally extending arm 302 and is bifurcated adjacent its upper end to receive the boom 306 therebetween, as best shown in FIG. 4. In order to support the boom 306 yet permit its inertial vibratory motion, a shaft 308 projects between the bifurcated upper end of the yoke 304 and carries a dual-section dependent arm 310 in pendulum-like fashion for pivotal movement about the horizontal axis of the shaft. At its lower end, such arm 310 pivotally carries a sleeve 312 that rotatably supports the boom 306 at a central portion thereof so that the entire boom structure can be rotated about its own longitudinal axis within such sleeve. Suitable collars 314 are secured on the boom 306 adjacent opposite ends of the sleeve 312 so that the boom position is fixed axially of the sleeve, but in view of the fact that the sleeve itself is pivotally suspended, longitudinal vibratory motion of the boom with the sleeve in substantially an axial direction is permitted.

Figure 12:
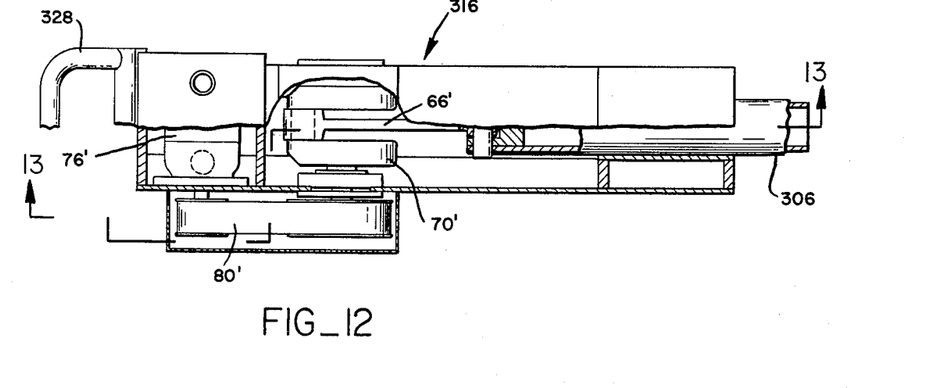
FIG. 12 is an enlarged top plan view of the shaking unit shown in FIG. 6, portions of the structure being broken away to illustrate interior structural details.
Figure 13:
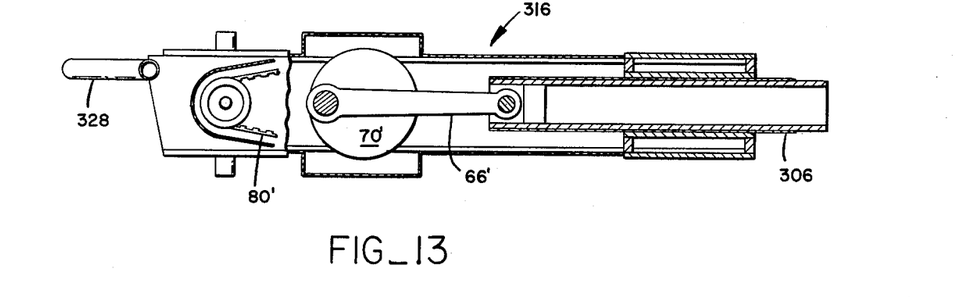
FIG. 13 is a broken sectional view taken along line 13—13 of FIG. 12.

The boom 306 is preferably of tubular construction similar to that described in connection with the first embodiment of the invention and slidably supports at its one end an inertia-shaking mechanism 316 and which is generally similar to that shown in FIGS. 1, 2, and 3 wherefore corresponding parts are identified by like numerals with an added prime notation. As best shown in FIGS. 12 and 13, the shaking mechanism 316 includes a hydraulic motor 76' that is connected by a belt and pulley arrangement 80' to actuate rotation of a suitable crank mechanism 70' and connecting rod 66' to the boom 306 wherefore inertial energy can be imparted between the motor and the boom to effect longitudinal inertial reciprocation of the latter. The hydraulic shaker motor 76' is connected by suitable hydraulic lines 320 extending along the boom 306 to a control valve 322 on the boom-supporting yoke 304, such valve being incorporated as part of a complete hydraulic actuating system to be described hereinafter. To set this valve 322, a control handle 324 extends from the valve to a position adjacent the end of the boom, a suitable brace 326 supporting such handle.

Preferably, the position of the shaking mechanism 316 at the end of the boom is such that a handle bar 328 projecting therefrom extends beyond the right side of the catching unit when the boom is transversely disposed, as shown in FIG. 5, so that an operator standing on the ground can, through manual grasping of this handle, effect a change in the disposition of the entire boom 306 and shaking mechanism 316 and move the remote end of the boom into appropriate disposition relative to a tree T that is to be shaken thereby. Furthermore, the operator also has ready access to the handle 324 for the described control valve 322.

In order to effect engagement with a tree T that is to be shaken or vibrated, a generally C-shaped clamp 330 is mounted at the remote end of the tubular boom 306 that lies, when transversely disposed as shown in FIG. 5, substantially over the left side of the catching unit. Such C-shaped clamp 330 includes a mounting bracket 332 that is fixed to one side of the outer end of the boom 306 and projects laterally and then forwardly therebeyond to rigidly mount at its extremity a laterally-projecting, fixed, tree-engaging jaw 334 of slightly curved or hooked configuration and covered by a series of small, laterally-adjacent rubber rings, as shown most clearly in FIG. 8. The forwardly projecting mounting bracket 332 is in the form of a U-channel member that receives between its inwardly directed flanges the lateral extremity of a moveable L-shaped bracket 336 that mounts a second tree-engaging jaw 338 so that the two jaws will be maintained in aligned relationship. The moveable jaw 338 is also of hooked or curved configuration and is covered with rubber rings so that on appropriate movement of the jaw, close resilient encompassment of a tree trunk or limb can be achieved. In order to effect motion of the moveable jaw 338, a rod 340 is secured to the end of the L-shaped bracket 336 so as to slideably enter the end of the hollow tubular boom 306 for connection to the end of a hydraulic actuating cylinder 342, the body of which is fixedly mounted within the boom and is provided with conventional laterally directed connections to flexible hydraulic lines 344 which extend along the length of the boom to a hydraulic control valve 346 on the boom supporting yoke 304. To actuate this clamp control valve 346, a second control handle 348 extends from it in substantial parallelism to the vibrator control handle 324 wherefore the shaker operator has immediate control of the boom position, the tree-clamp and the shaking mechanism.

In accordance with another aspect of the present invention, the mentioned hydraulic actuating system is arranged to provide motive power and control of the driven elements of both the catcher unit and the shaker unit mounted thereon. With additional reference to the diagram of FIG. 9, such hydraulic actuating system includes the pump 210 that is driven by the gasoline engine 212 mounted at the right rear of the catching unit, as previously described. Such pump draws hydraulic fluid from the mentioned reservoir or tank 211 mounted on the catching unit and delivers such fluid through three main control valves whose settings determine which elements of the catcher and shaker units are energized. Initially, the fluid passes into a catcher control valve 290 which constitutes a four-way valve operable at 2000 pounds per square inch which constitutes the full operating pressure of the hydraulic system. Hydraulic conduits extend from the catcher valve 290, which is physically located closely adjacent the hydraulic pump 210 on the catcher unit (see FIG. 4), and pass through a pressure control valve 292 to the hydraulic motor 208 that drives the rear wheels 204 of the catcher, as described, either forwardly or rearwardly. The pressure control valve 292 is made variable so that the fluid supplied to the hydraulic motor 208 will have a pressure within a range of from 100–2000 pounds per square inch, the hydraulic fluid being returned to the reservoir 211 through a suitable return hydraulic line. Alternate setting of the catcher valve 290 allows flow of fluid directly through the main hydraulic conduit to the shaker control valve 322 which is mounted, as previously described, on the boom-supporting yoke 304. This shaker valve 322 also constitutes a four-way valve operable at 2000 pounds per square inch, and under control of the described handle 324 accessible to the operator of the shaker, delivers fluid through the flexible lines 320 to the shaker motor 318 and thence back through a return line to the shaker valve. Fluid from the shaker valve 322 passes through the main conduit to the clamp valve 346 that is also physically located on the boom-supporting yoke 304. The clamp valve 346 incorporates a pressure control mechanism so that it constitutes a four-way valve normally operable at a pressure of approximately 600 pounds per square inch, such pressure having been found desirable in achieving clamping engagement of the tree with the described clamp structure. Fluid emanating from the clamp valve 346 is returned through a suitable flexible conduit to the hydraulic fluid reservoir 211. It will be observed that although various pressures are required in various parts of the harvester unit for appropriate actuation and control, the described hydraulic actuating system meets the needs for all of these elements although supplied from a single source of hydraulic pressure. Furthermore, the control for the catching unit is at one physical position thereon so that the driver of the mobile unit can readily control motion of such unit. On the other hand, the shaker control valves are mounted on the shaker unit and are accessible to the operator controlling the position of the boom so that facility in positioning of the boom, clamping of the boom to the tree, and subsequent vibration of the boom and the tree is under his immediate control.

In operation of the harvesting unit, the harvester operator drives the entire unit through the orchard while the left wing 240 is rolled or retracted, the boom 306 is somewhat longitudinally aligned with the catching frame 200, and the bin-receiving forks 280 are slightly raised to provide good ground clearance. With the elements so positioned, the driver steers the mobile unit through the orchard until the left side thereof is substantially centrally aligned with the tree T from which fruit or nuts are to be harvested, and spaced some two or three feet therefrom, such latter clearance permitting the operator to drive the unit at a sufficient distance from the tree to avoid collision therewith and consequent damage to the tree or the harvester frame. After the lateral centrally aligned disposition is attained, drive to the rear wheels 204 is stopped and the left wing 240 is released so that it may project itself laterally into a position of engagement with the tree trunk, the central resilient portion of the wing resiliently engaging and encompassing such trunk, as best shown in FIG. 5. It is to be observed that since the left wing 240 projects itself straight outwardly from the frame 200, it can freely pass under the low hanging branches of the tree T. Once this harvesting position has been obtained, the driver of the unit actuates the endless conveyor 218 and lowers the forks, if necessary, so that the bins thereon are below the end of the conveyor at the rear of the unit. While the driver performs these operations, the shaker operator manually positions the boom 306 on its pivotal support until the C-clamp 330 is in loose encompassing relationship with the trunk of the tree T or with a limb of a tree, if desired. He thereupon grasps the clamp handle 348 and effects tight resilient closure of the clamp on the trunk or limb of the tree T, and thereafter through use of the shaker handle 324 instigates actuation of the shaker motor 318 to impart a substantially axial to and fro force through the boom 306 to the clamp 330 and thus to the engaged tree T. It will, of course, be understood that a similar catching unit will be preferably positioned on the opposite side of the tree, and the two units receive the fruit or nuts dislodged from the tree by the vibration thereof and subsequently effect conveyance thereof into the receiving bins or boxes. It may be observed that the power requirements for the combined shaker and catching unit are not excessive since the shaker motor 318 does not operate when the mobile unit is moving and vice versa. It has been found in practice that a fifteen horsepower gasoline engine is more than adequate to meet all of the power requirements of the entire unit.

Figure 10:
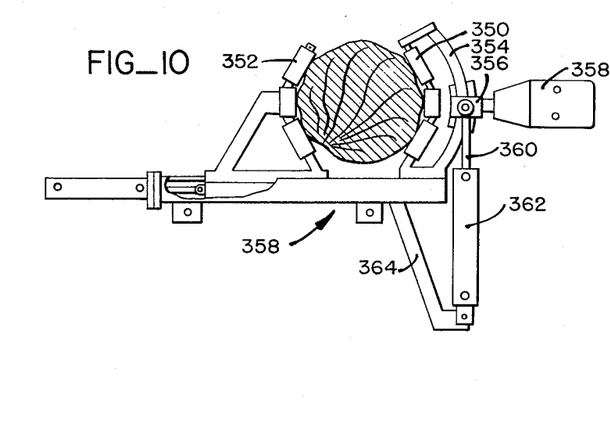
FIG. 10 is an enlarged fragmentary bottom plan view of the end portion of a modified form of tree-engaging and shaking mechanism.
Figure 11:
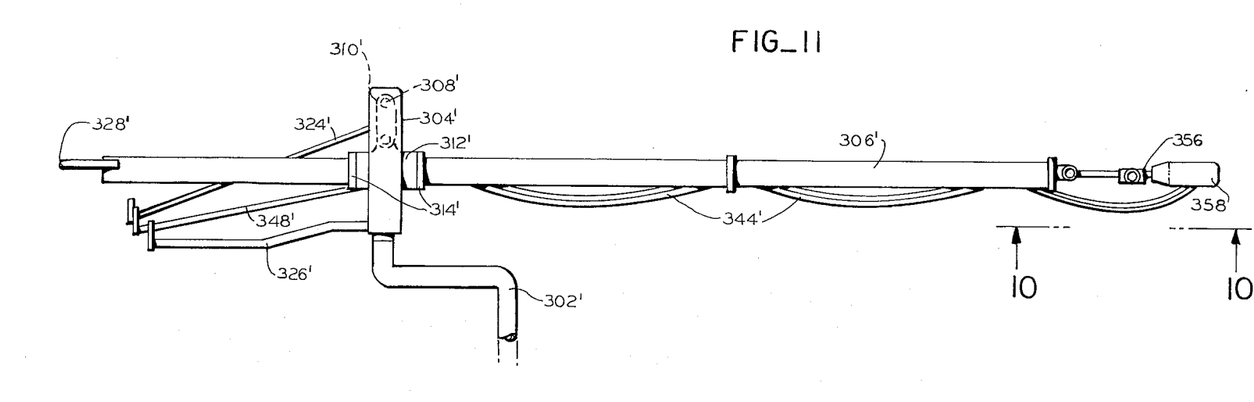
FIG. 11 is a side elevational view of such modified form of tree-engaging and shaking mechanism partially illustrated in FIG. 10.

In the harvesting of certain types of fruit or nuts, it has been found that more effective harvesting is accomplished if the vibratory forces are exerted from various angles and, for this purpose, a modified embodiment of a portion of the harvesting unit is illustrated in FIG. 10 and FIG. 11. Elements in these figures of like nature are identified by like numerals with an added prime notation, such modification entails placement of the shaker unit directly on the clamp structure in a manner such that the shaker can be angularly adjusted relative to the axis of the tree during operation so that a variation of the force angle can be achieved. As shown in FIG. 10, the clamp structure itself is generally similar to that described and illustrated in FIG. 8 including a fixed jaw 350 and a moveable jaw 352 that can be hydraulically moved into tree encompassing relationship, the entire structure being supported at the end of a boom 306' that is centrally supported for pivotal motion on arms 310' supported from a yoke 304' substantially like the mechanism shown in FIGS. 5 and 6. Since the shaker mechanism has been placed at the clamp end of the boom, weight can be added to the boom 306' adjacent the handle 328' at its remote end to maintain a structure which is balanced like that shown in FIGS. 5 and 6. The fixed jaw 350 is modified in that it includes an arcuate rod 354 spaced outwardly therefrom in substantially parallel relationship and slideably supporting a bracket 356 which is connected to one end of a shaker unit 358 similar to that described in connection with the second embodiment of the invention so that forces from such shaker unit will be directed substantially through the vertical axis of the tree T. More particularly, the shaker unit 358 corresponds to that shown in FIGS. 12 and 13 including a hydraulic motor driven from a suitable hydraulic pump through lines 344' to actuate a crank and connecting rod and thus similarly provide the inertial shaking force. The projecting rod 360 of an actuating hydraulic cylinder 362 is also connected pivotally to the shaker bracket 356 and the remote end of the hydraulic cylinder is pivotally secured to a mounting bracket 364 projecting laterally and forwardly from the main support for the fixed jaw 350. Suitable hydraulic connections (not shown) to this hydraulic cylinder 362 enable motion of the shaker bracket 356 slideably along its arcuate supporting rod 354 so that the entire shaker unit 358 is carried therewith and the angle of its applied force is accordingly varied, it being notable that the direction of the force vector always extends substantially through the central vertical axis of the tree T.

The operation of this shaking mechanism is substantially similar to that described with respect to the previous embodiments, but it is to be particularly observed that during operation of the shaker unit, 358, its position may be changed through suitable hydraulic actuation of the positioning cylinder 362. Thus, during vibration of a tree T, the angle of vibration can be changed and the operator may observe its results and their effectiveness. Furthermore, clamping engagement is maintained with the tree throughout such angular adjustment of the applied forces and limb or bark damage is thus avoided.

Various other modifications and/or alterations of the described structures can obviously be made without departing from the spirit of the invention; and accordingly, the foregoing description of several embodiments is to be considered as purely exemplary and not in a limiting sense. The actual scope of this invention is to be indicated by reference to the appended claims.

What is claimed is:

1. A fruit and nut harvester which comprises a generally horizontal mobile frame, an endless conveyor having upper and lower flights mounted for movement generally longitudinally of said frame, wings extending laterally outwardly and upwardly from said frame on both sides of said conveyor, a boom having a tree-engaging clamp at one end thereof, means supporting said boom on said frame for free substantially longitudinal displacement, and means including powered positively acting reciprocating means connected to and mounted on said boom for axial motion relative to said boom for actuating longitudinal reciprocatory motion thereof whereby a tree engaged by said clamp is shaken to dislodge the fruit or nuts thereon but substantially no force is transmitted to said frame, said boom-supporting means being arranged so that lateral translational movement of said boom is substantially precluded.

2. A fruit and nut harvester according to claim 1 wherein said wings are mounted on said frame for movement between extended positions and retracted positions entirely adjacent the edge of said conveyor.

3. A fruit and nut harvester according to claim 1 wherein the upper flight of said endless conveyor slopes upwardly longitudinally of said frame, and which harvester includes means for supporting receiving bins adjacent the higher end of said conveyor flight.

4. A fruit and nut harvester which comprises a generally rectangular mobile frame, means including a hydraulic motor for moving said frame, drive means including a hydraulic pump on said frame for driving said motor, means including a valve on said frame for controlling hydraulic connection between said pump and frame motor, a boom having a tree-engaging clamp at one end thereof, means supporting said boom on said frame for longitudinal displacement, means including a hydraulic motor on said boom and positively acting reciprocating means interconnecting said motor and said boom for effecting longitudinal reciprocation of said boom, means on said boom including a hydraulic cylinder for actuating said tree-engaging clamp, and means including control handles on said boom for controlling hydraulic connection between said boom motor and said clamp cylinder with said hydraulic pump, said valve and said boom motor and cylinder control means being selectively energizable to alternatively actuate motion of said mobile frame or said boom motor and clamp cylinder.

5. A fruit and nut harvester which comprises a mobile support, a boom having a tree-engaging clamp at one end thereof, means supporting said boom on said support for free substantially longitudinal displacement, and means carried from said boom for actuating longitudinal reciprocatory motion thereof whereby a tree engaged by said clamp is shaken to dislodge the fruit or nuts therefrom but substantially no force is transmitted to said mobile support, said boom-supporting means being arranged so that lateral translational movement of said boom is substantially precluded.

6. A fruit and nut harvester according to claim 5 wherein said boom-supporting means includes pivot means permitting both vertical and horizontal angular variation in the disposition of said boom.

7. A fruit and nut harvester according to claim 5 wherein said boom-supporting means includes means for adjusting said boom longitudinally relative to said mobile support.

8. A fruit and nut harvester according to claim 5 wherein said boom-reciprocating means is mounted on said boom at a position remote from said tree-engaging clamp.

9. A fruit and nut harvester according to claim 5 wherein said boom reciprocating means is mounted on said clamp.

10. A fruit and nut harvester according to claim 9 which comprises means mounting said reciprocating means for angular adjustment relative to said boom whereby forces applied to an engaged tree are made variable in their direction of application.

11. A fruit and nut harvester which comprises a tree-engaging clamp, means adjustably supporting said clamp for positioning in tree-encompassing relation, means actuating said clamp to establish tight-gripping engagement with the tree, and an inertia tree shaking mechanism adjustably supported on said clamp for angular adjustment relative to said clamp whereby shaking forces can be applied to the tree at various selected directions.

12. A fruit and nut harvester which comprises a generally horizontal mobile frame, an endless conveyor mounted for movement generally longitudinally of said frame, wings extending laterally outwardly and upwardly from said frame on both sides of said conveyor, one of said lateral wings being flexible, and means including a rotatable shaft for rolling said flexible wing thereon from extended to retracted position, with said flexible wing rolled in a spiral configuration thereon.

13. A fruit and nut harvester according to claim 12 which comprises wing-extension means connected between said frame and the lateral extremity of said flexible wing to resiliently urge said wing toward its extended disposition.

14. A fruit and nut harvester according to claim 12 wherein the central portion of the lateral extremity of said flexible wing includes a resilient supporting member adapted to resiliently engage a tree trunk upon extension of said wing thereagainst.

15. A fruit and nut harvester which comprises an inertia shaking mechanism carrying a boom for free axial movement relative to said shaking mechanism, means carried on said boom adapted to grip a fruit or nut tree to be shaken, means carried on said inertia shaking mechanism for vibrating said boom axially with respect thereto, and mounting means holding said shaking mechanism and said boom in a manner which allows free axial reciprocation of said shaking mechanism whereby the longitudinal vibration of said boom and the tree gripped thereby is balanced by the opposed longitudinal vibration of said shaking mechanism, said mounting means holding said shaking mechanism and said boom so that lateral translational movement thereof is substantially precluded.

16. A tree shaking device which comprises a support, a boom carried from said support for free substantially axial movement with respect thereto, a source of power carried from said support for free axial movement relative to said support and said boom, and a positively-acting reciprocating means interconnecting said source of power and said boom whereby the axial movement of said boom is balanced by the opposed axial movement of said power source, said boom and said source of power being carried so that lateral translational movement thereof is precluded.

References Cited by the Examiner
UNITED STATES PATENTS

| | | | |
|---|---|---|---|
| 1,027,403 | 5/1912 | Darling. | |
| 1,626,068 | 4/1927 | Bartlett | 56—329 X |
| 2,386,881 | 10/1945 | Phillips | 56—329 X |
| 2,436,648 | 2/1948 | Isom | 56—329 |
| 2,522,906 | 9/1950 | Smith | 56—328 X |
| 2,690,639 | 10/1954 | Goodwin. | |
| 2,692,470 | 10/1954 | Bowman | 56—328 |
| 2,700,268 | 1/1955 | Lowe. | |
| 2,714,281 | 8/1955 | Steele | 56—329 |
| 2,913,866 | 11/1959 | Curtis | 56—329 |
| 3,041,811 | 7/1962 | Sides | 56—328 |
| 3,077,721 | 2/1963 | Balsbaugh | 56—328 |

ABRAHAM G. STONE, *Primary Examiner.*

M. C. PAYDEN, *Assistant Examiner.*